Patented Mar. 7, 1944

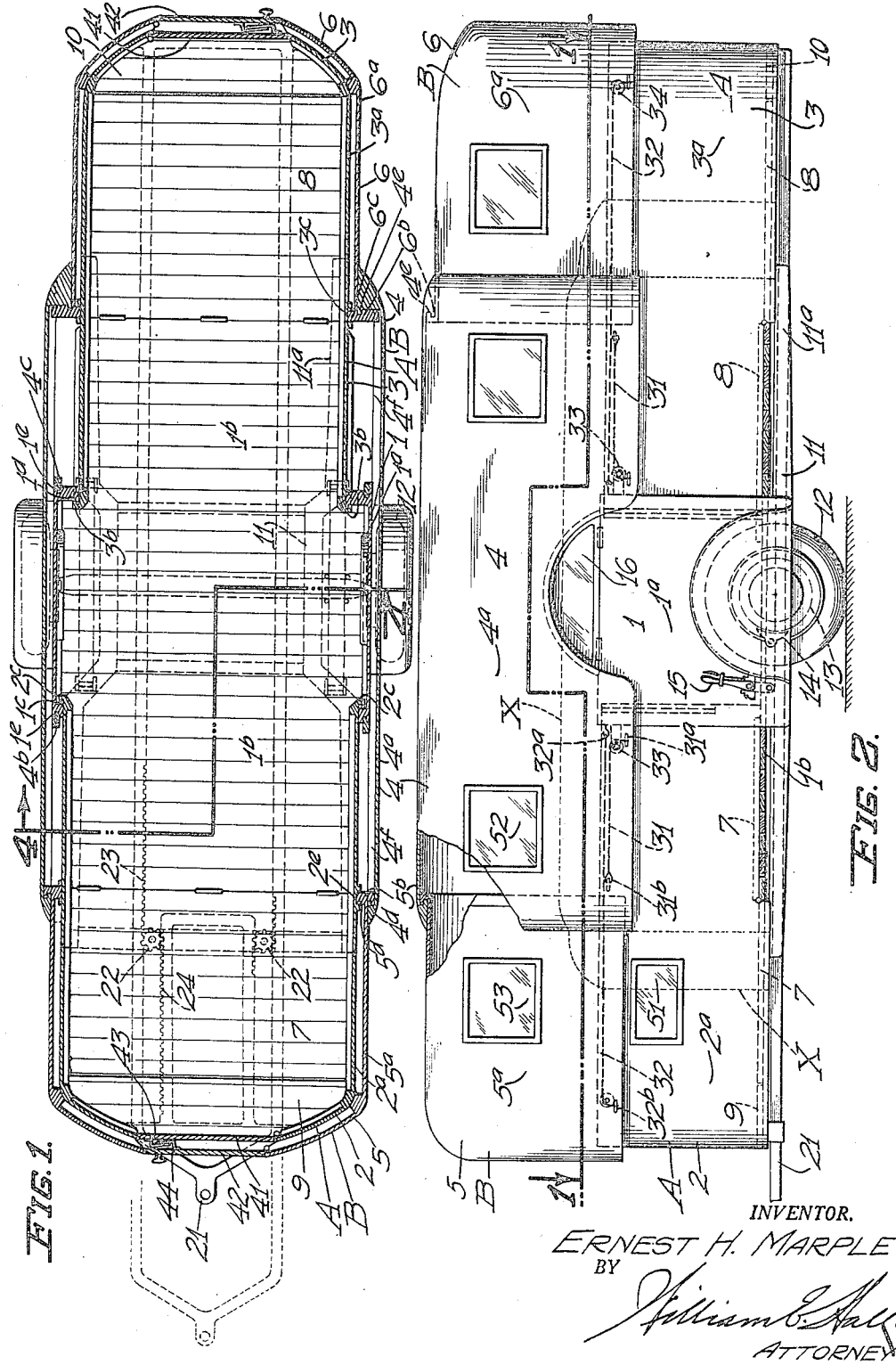

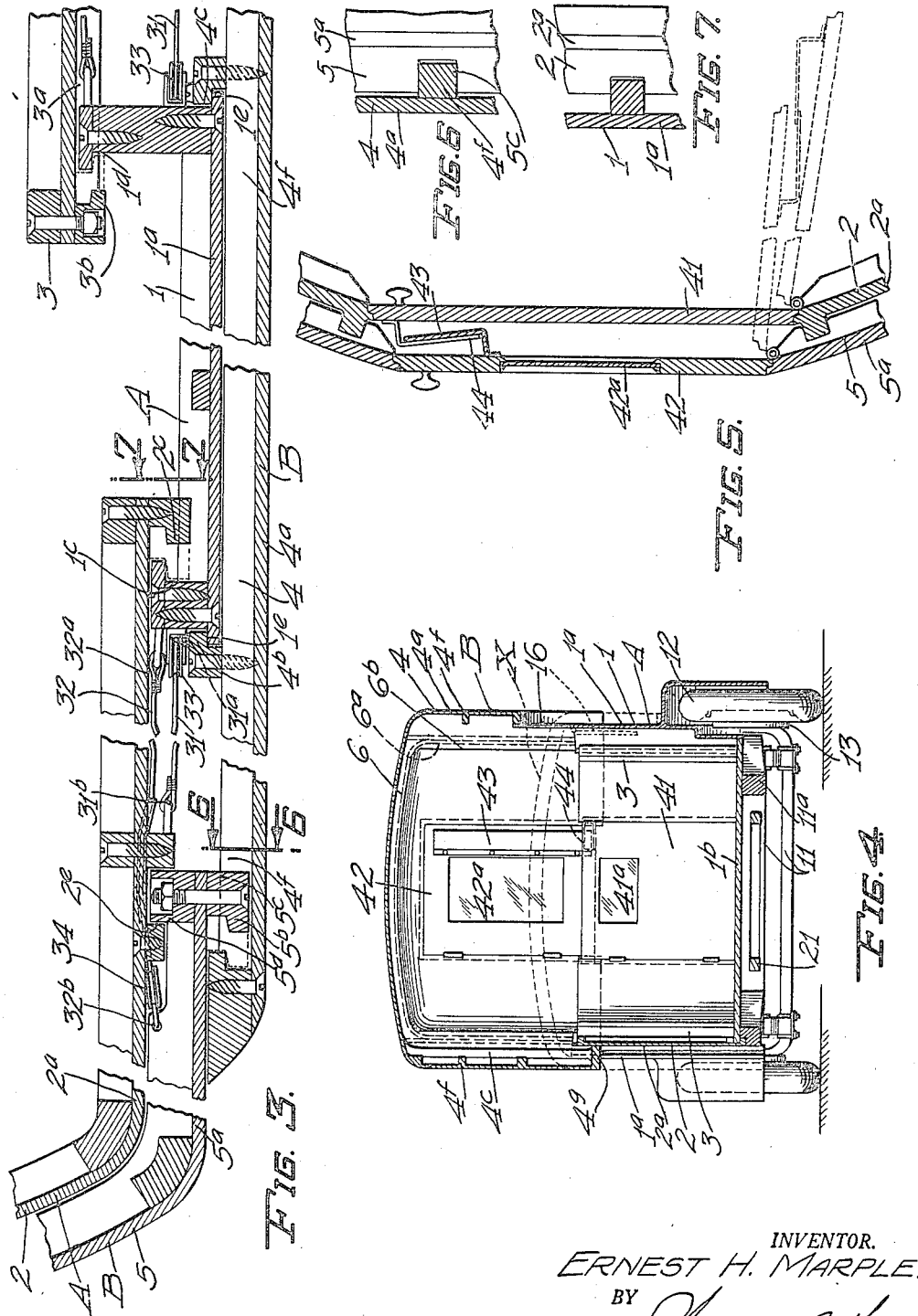

2,343,261

UNITED STATES PATENT OFFICE 2,343,261

COLLAPSIBLE TRAILER

Ernest H. Marple, San Diego, Calif.

Application August 11, 1941, Serial No. 406,251

12 Claims. (Cl. 296—23)

My invention relates to a collapsible trailer, primarily to a trailer as used for camping purposes.

One of the principal objects of this invention is to provide a trailer which may be collapsed into relatively compact form so that it may be conveniently transported over the road, and which is so constructed that it may be easily and quickly expanded to convenient living quarters.

An important object of this invention is to provide a collapsible trailer of this class which may be readily expanded by means of a tractor vehicle, and specifically by and when the latter is in motion, and further to provide a trailer of this class which may be readily collapsed by the opposite movement of the tractor vehicle.

Another important object of this invention is to provide a trailer of this class whereby the various parts or sections are so connected that they may be moved, extended, or expanded to the desired expanded positions without leaving any open spaces, and whereby the trailer may be readily locked into such expanded condition.

A further object of this invention is to provide novel means for simultaneously extending the opposite ends of the trailer structure.

A still further important object of this invention is to provide novel means for raising the upper sections of my trailer when the end sections are longitudinally extended.

An important object also of this invention is to provide simple and novel means of expanding the trailer sections.

Still another important object of this invention is to provide a novel and simple floor construction for my trailer, which may be easily unfolded when the trailer sections are extended, for locking the trailer in such expanded condition.

An important object also is to provide a novel door construction for a collapsible trailer of this class.

With these and other objects in view as will appear hereafter, I have devised a collapsible trailer having certain novel features of construction, combination, and arrangement of parts and portions, as will hereafter be described in detail and particularly set forth in the appended claims, reference being had to the accompanying drawings and to the characters of reference thereon, which form a part of this application, in which:

Fig. 1 is a sectional plan view of my trailer in its expanded condition, with the section taken at 1—1 of Fig. 2;

Fig. 2 is a side elevation thereof, showing portions broken away and in section to facilitate the illustration;

Fig. 3 is an enlarged fragmentary section in plan showing the relation of the movable sections, said sections being shown partly collapsed;

Fig. 4 is a transverse sectional elevation taken through 4—4 of Fig. 1;

Fig. 5 is an enlarged section in plan of the sliding door construction, the door panels being shown by dotted lines in open positions; and, Figs. 6 and 7 are fragmentary cross-sections showing the horizontal sliding construction of several of the movable sections, the cross-sections being taken through 6—6 and 7—7 of Fig. 3.

My collapsible trailer may be said to consist of a lower unit A and an upper unit B, the lower unit consisting of a center section 1 and front and rear end sections 2 and 3, and the upper unit consisting of a center section 4 and front and rear end sections 5 and 6, the sections of the upper unit being positioned respectively over the sections 1, 2, and 3 of the lower unit.

The center section 1 is supported on or forms a part of the chassis of the trailer. The chassis has a frame 11, which, for the purpose herein, consists of a pair of spaced-apart longitudinal beams or members 11ª. The frame 11 is supported on a pair of wheels 12, having brake drums 13. A suitable brake 14 is provided to engage the drum. A suitable braking mechanism 15 is provided on the trailer for applying the brakes, a lever or other manual means being preferable for this purpose.

The center section 1, which is carried on the chassis and which will be referred to herein as a chassis, is provided with a floor portion 1ᵇ and vertical wall portions 1ª extending upwardly from the lateral sides of the floor portion, the forward and rear ends of the floor portion extending beyond the forward and rear edges of the side walls 1ª. The side walls 1ª are positioned preferably laterally of the edges of the floor portion and the longitudinal beams 11 of the chassis, as shown in Fig. 1 of the drawings, and for the purposes hereinafter described.

The transverse cross-sections of the end sections 2 and 3 are preferably U shaped, both vertically and horizontally, the inner ends being open and the outer ends being substantially closed, except as hereinafter set forth. The inner portions of the lower edges of the opposite side walls 2ª of the end section 2 are rabbeted, and into said portions extend the lateral edges of the floor portion 1ᵇ, that is, the portions of the lateral edges which extend beyond the side walls 1ª. The lower edges of these rabbeted portions may ride in and upon rabbeted portions between the floor portion 1ª and the beams 11ª, as shown in Figs. 2 and 4. In this manner the side walls of the lower end sections are prevented from being raised or lowered with respect to the center section 1 or chassis. The inner ends of the side walls have laterally extending locking portions 2ᶜ which engage and interlock with inwardly extending portions 1ᶜ on the side walls 1ª, and thereby prevent the end sections 2 from being withdrawn beyond the point of engagement of the portions 1ᶜ and 2ᶜ.

The inner portions of the lower edges of the side walls of the rear end section 3 are similarly mounted with respect to the floor portion 1ᵇ and the beams 11ª to permit longitudinal sliding with respect to the center section 1, and the inner ends of the side walls 3ª thereof are also provided with lateral locking portions 3ᵇ which engage inwardly extended portions 1ᵈ at the rear edges of the side walls 1ª, to limit the outward positions of the rear lower end sections.

The length of the side walls 1ª is preferably only slightly more than the distance of the longitudinal shifting of the end sections. For this reason the side walls of the lower rear end section are positioned closer than the side walls of the lower front end section, permitting the side walls of the front and rear sections to pass each other, or assume an overlapped position, when the trailer is collapsed, the walls of the rear end section being located inwardly from the side walls of the front end section, as shown in Fig. 3.

The center section 4 of the upper unit is of inverted U shaped cross-section, and is considerably longer than the side walls of the lower center section. The side walls 4ª of the upper center section have vertical guides 4ᵇ and 4ᶜ which extend into vertical grooves 1ᵉ at the forward and rear edges of the side walls of the lower center section 1, the center section 4 of the upper unit being guided thereby in the vertical movement of the upper unit with respect to the lower unit. The inner ends of the side walls 5ª and 6ª, of the front and rear end sections 5 and 6 of the upper unit, have laterally outwardly extended locking portions 5ᵇ and 6ᵇ, which engage respectively laterally inwardly extending locking portions 4ᵈ and 4ᵉ located at respectively the forward and rear edges of the side walls of the upper center section. The end sections of the upper unit are thereby limited in their outward movement with respect to the center section. The center and end sections may be provided with tongue and groove portions 4ᶠ and 5ᶜ, as shown best in Figs. 3 and 6 of the drawings.

The inner ends or portions of the lower end sections are also provided with tongue and groove portions, as shown best in Figs. 3 and 7 to facilitate horizontal shifting.

The end sections of the lower and upper units are also locked with respect to each other by groove and tongue portions 2ᵉ and 5ᵈ, and 3ᶜ and 6ᶜ, respectively, so that the corresponding end sections of the lower and upper units must be simultaneously extended or contracted longitudinally.

Thus, it will be seen that when the various sections are fully extended, the forward and rear ends of the upper center section overlap the side walls and roof portions of the end sections of the upper unit. Likewise the forward and rear ends of the side walls of the lower center section overlap the side walls of the lower end sections. Also the lower edges of the sections of the upper unit overlap the corresponding side walls of the sections of the lower unit.

The space between the side walls of the upper center section and the side walls of lower end sections, when the trailer is extended, is closed at the bottom by a horizontal panel 4ᵍ.

The forward and rear ends of the floor portion 1ᵇ are preferably coincident with the inner ends of the side walls of the upper end sections when the latter are fully extended. The side rails or beams 11ª of the chassis extend beyond the edges of the floor, as shown. To the front and rear edges of this floor portion are hinged front and rear floor panels or sections 7 and 8. These floor sections may be folded inwardly upon the center floor section 1ᵇ when the trailer is collapsed, and may be unfolded outwardly when the end sections are fully extended, thereby holding the various trailer sections in their extended positions. Beyond the free ends of the floor panels 7 and 8 are short floor panels 9 and 10 which are fixed to the end portions of the lower end sections 2 and 3, respectively.

To the lower portion of the lower rear end section is secured a draft member 21 which extends forwardly of the front end section, even when the trailer is open or expanded. On the forward portion of the longitudinal beams or frame members 11ª of the chassis I have shown a pair of pinions 22 each of which engage at opposite sides a pair of gear racks 23 and 24. The former are shown as provided on the inner sides of the draft member 21 while the latter are shown at the outer sides of a frame carried at the under portion of the front end section 2. Thus, when the draft member 21 is forced inwardly the pinions 22 are rotated by the gear racks 23, thereby forcing outwardly the gear racks 24 and the front end section 2.

At the front and rear ends of the trailer are provided mechanisms for raising the sections of the upper unit. These mechanisms may be located between the walls of the lower end sections 2 and 3 and the upper center section 4 and the side walls of the upper end sections 5 and 6. These mechanisms are located beyond the edges of the side walls of the lower center section. Each of these mechanisms consist of a pair of cables 31 and 32 for raising respectively the upper center section 4 and the end sections 5 or 6. Each cable 31 extends around a sheave 33 which is mounted near the upper end of one edge of the lower center section 1, and one end of the cable is connected to the inner side and near the lower edge of the center section 4, as indicated by 31ª, while the other end 31ᵇ is connected to the outer sides of the respective lower end section 2 or 3. Each cable 32 extends around a sheave 34 carried on the outer side and near the upper edges and outer portion of the lower end sections. One end 32ª of each cable 32 is connected to the upper portion of one edge of the lower center section 1, while the other end 32ᵇ of the cable is fastened to near the end of the lower portion of the upper end section.

In this manner the upper center section and the upper end sections are drawn upwardly by the cable as the upper end sections are forced outwardly with respect to the upper center section from the collapsed position, shown by dotted lines, designated X.

Doors for the trailer may be provided at the front and rear ends. Each door is made of two sections or panels, a lower section 41, hinged on the lower end section 2 or 3, and an upper section 42, hinged on the upper end section 5 or 6. Since the upper sections are located outwardly from the lower, the door section 42 is positioned outwardly from the lower door section 41. This necessitates horizontal sliding of the door sections or panels when the door is opened. The two door sections are held together at their free ends by overlapping Z-shaped plates 43 and 44 secured to the adjacent sides, and near the free edges of the door sections 41 and 42, respectively.

The Z-plate 43 is substantially as long as the upper panel 41, while the plate 44 is made short so that it cannot be seen from the outside. These plates are so arranged that the panels of the door may be opened to permit access to the interior when the trailer is collapsed. The outer or fixed floor panels 9 and 10 allow the hinged panels 7 and 8 to be folded over the top of the center floor section to provide sufficient clearance to permit such opening of the doors.

These door panels have windows 41a and 42a which partially register with each other when the trailer is collapsed to provide light in the interior of the trailer when in a collapsed condition.

The various telescoping trailer sections may also have windows which are so arranged that they are at least in partial registry when the trailer is collapsed to provide light in the interior when in the latter condition. Such windows are indicated by 51, 52, and 53, located respectively in the walls of the side walls of the trailer sections 2, 4, and 5.

It will be here noted that the wheels, instead of being positioned outwardly from the body of the trailer, as shown, may be located inwardly of the side walls or contour of the side walls of the center section 1. Such construction necessitates either narrowing or lengthening of the trailer. Such alteration or modification being obvious to those versed in the art, no illustration thereof is necessary.

Because of the laterally extended position of the wheels and because of the maximum lowering or collapsing of the upper center section 4, the side walls of such section are recessed, as shown best in Fig. 2, to receive the wheels or fenders of the wheels. The upper portion of the recess, in this instance, extends above the upper edge of the lower center section. Such opening is covered by a, preferably hinged, panel 16, which, in this instance, is a window. When the trailer is collapsed, the hinged panel 16 may drop against the inside of the side wall of the lower center section, as shown by dotted lines in Fig. 4.

Although I have shown and described a particular construction, combination, and arrangements of parts and portions, I do not wish to be limited to the same, but desire to include in the scope of my invention the construction, combination, and arrangements substantially as set forth in the appended claims.

I claim:

1. A collapsible trailer, comprising a lower and an upper telescoping unit, each consisting of a center section and end sections, the latter being slideably mounted with respect to the walls of the center sections, and the sections of the upper unit being slideably mounted over the corresponding sections of the lower unit, the side walls being substantially rigid with respect to the several sections, and substantially enclosing the trailer when collapsed or when expanded.

2. A collapsible trailer, comprising a lower and an upper telescoping unit, each consisting of a center section and end sections, the latter being slideably mounted with respect to the walls of the center sections, and the sections of the upper unit being slideably mounted over the corresponding sections of the lower unit, the inner ends of the end sections of the lower unit overlapping each other when said sections are shifted to their innermost positions, the ends of the center sections being substantially sealed with respect to the walls of the corresponding end sections when the latter sections are either at their inner or extended positions.

3. A collapsible trailer, comprising a chassis, end sections longitudinally slideable with respect to the chassis and extensible outwardly beyond the opposite ends thereof, and means connecting the chassis and end sections in such a manner that the end sections are simultaneously moved outwardly, one end section having a draft member extending below and beyond the other end section, inward movement of the draft member causing simultaneous extension of the end sections.

4. A collapsible trailer, comprising a chassis having wheels, brakes for the wheels, end sections longitudinally slideable with respect to the chassis and extensible outwardly beyond the opposite ends thereof, and means connecting the chassis and end sections in such a manner that the end sections are simultaneously moved outwardly, one end section having a draft member extending below and beyond the other end section, inward movement of the draft member, when the brakes are applied, causing simultaneous extension of the end sections.

5. A collapsible trailer, comprising a lower and an upper telescoping unit, each consisting of a center section and end sections, the latter being slideably mounted with respect to the walls of the center sections, and the sections of the upper unit being slideably mounted in a vertical direction over the corresponding sections of the lower unit, and means for causing said end sections to be simultaneously moved outwardly or inwardly with respect to the chassis, one end section of the lower unit having a draft member extending below and beyond the other end section of the lower unit, inward movement of the draft member causing said end sections simultaneously to be moved outwardly.

6. A collapsible trailer, comprising a lower and an upper unit, a draft member for the trailer, said draft member being movable with respect to the lower unit, and means connecting the upper unit to the lower unit in such a manner that the former is raised with respect to the lower unit when the draft member is moved with respect to the lower unit.

7. A collapsible trailer, comprising a wheeled chassis having a transverse U-shaped cross-section, the length of the cross portion, considered longitudinally with respect to the longitudinal extent of the trailer, being greater than the opposite side walls and extending beyond the same, end sections telescopically mounted in a longitudinal direction on the chassis and slidable between said side walls, the end sections having side walls slidable against the inner sides of the side walls of the chassis, the cross portion forming a central floor section, the lower edge portions of the side walls of the end sections being slidably mounted at the lateral edges of the portion of the central floor section extending beyond the ends of the side walls of the center section, and floor panels hinged to the front and rear edges of the central floor section and adapted to be lowered substantially flush with the central floor section when the end sections are extended.

8. A collapsible trailer, comprising a chassis, an end section longitudinally extensible with respect to the chassis, and outwardly beyond one end thereof, the end section having a draft member secured at one end to the lower portion of the section, the other end of the draft member extending beyond the other end of the chassis, inward movement of the draft member causing longitudinal extension of said end section with respect to the chassis.

9. A collapsible trailer comprising a lower telescoping unit and an upper telescoping unit, the upper unit also telescoping with respect to the lower unit, two sections of the upper unit and one section of the lower unit having windows, providing three separate windows when the trailer is expanded, said windows being positioned opposite each other when the trailer is collapsed, providing a single window for the interior of the collapsed trailer.

10. A collapsible trailer comprising a lower and an upper telescoping section, each section having a door, and means slidably connecting the doors in such a manner that they may be operated as a unit when the sections are collapsed or expanded.

11. A collapsible trailer, comprising a telescoping unit consisting of a center section and end sections, the end sections being slidably mounted with respect to the walls of the center section, the inner ends of the end sections overlapping each other when said sections are shifted to their innermost positions, the ends of the center sections being substantially sealed with respect to the walls of the corresponding end sections when the latter sections are either at their inner or extended positions.

12. A collapsible trailer, comprising a frame of transverse U-shaped cross-section, the length of the cross portion, considered longitudinally with respect to the longitudinal extent of the trailer being greater than the corresponding length of the opposite side walls, and one end of the cross portion extending beyond the corresponding end of said side walls, and an end section telescopically mounted in a longitudinal direction on the frame, the end section also having side walls slidable against the inner sides of the side walls of the frame, the cross-portion forming a floor section of the frame, the lower edge portions of the side walls of the end section being slidably mounted at the lateral edges of that portion of the floor section extending beyond the ends of the side walls of the frame, and a floor panel hinged to one of the end edges of said floor section and adapted to be lowered substantially flush therewith when said end section of the trailer is extended with respect to the frame.

ERNEST H. MARPLE.